US011803512B2

(12) United States Patent
Khan et al.

(10) Patent No.: US 11,803,512 B2
(45) Date of Patent: Oct. 31, 2023

(54) SYSTEMS AND METHODS FOR DISTRIBUTED LEDGER ARCHIVING AND SIZE MANAGEMENT

(71) Applicant: Verizon Patent and Licensing Inc., Basking Ridge, NJ (US)

(72) Inventors: Ahmed A. Khan, Plano, TX (US); Jeaha Yang, Darien, CT (US); Rasmi Ranjan Samal, Hyderabad (IN); Rangesh Sripathi, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/655,203

(22) Filed: Mar. 17, 2022

(65) Prior Publication Data
US 2023/0297540 A1     Sep. 21, 2023

(51) Int. Cl.
*G06F 16/00* (2019.01)
*G06F 16/11* (2019.01)
*G06F 16/2458* (2019.01)
*G06F 16/23* (2019.01)
*G06F 16/248* (2019.01)

(52) U.S. Cl.
CPC ........ *G06F 16/125* (2019.01); *G06F 16/2358* (2019.01); *G06F 16/248* (2019.01); *G06F 16/2477* (2019.01)

(58) Field of Classification Search
CPC .............. G06F 16/125; G06F 16/2477; G06F 16/2358; G06F 16/248
USPC .................................... 707/600–899
See application file for complete search history.

(56) References Cited

U.S. PATENT DOCUMENTS

| | | | |
|---|---|---|---|
| 2017/0337534 A1* | 11/2017 | Goeringer | H04L 63/12 |
| 2020/0005403 A1* | 1/2020 | Patterson | G06Q 20/10 |
| 2020/0356969 A1* | 11/2020 | Cho | G06Q 50/10 |
| 2021/0280306 A1* | 9/2021 | Fairless | G16H 40/20 |
| 2021/0303552 A1* | 9/2021 | Pandey | H04L 9/0637 |

* cited by examiner

*Primary Examiner* — Michelle N Owyang

(57) ABSTRACT

A system described herein may generate a group of distributed ledgers that are each associated with a respective set of ledger parameters, receive a data item that is associated with a set of attributes, identify a distributed ledger that is associated with ledger parameters that meet the set of attributes, and record the data item to the distributed ledger that is associated with ledger parameters that meet the particular set of attributes. The system may determine that a set of archival parameters, associated with a particular distributed ledger, have been met; and may remove the particular distributed ledger from the group of distributed ledgers based on determining that the set of archival parameters, associated with the particular distributed ledger, have been met. Nodes that maintain the group of distributed ledgers may remove ledger data, associated with the removed distributed ledger, from one or more storage resources associated with the nodes.

20 Claims, 11 Drawing Sheets

SYSTEMS AND METHODS FOR DISTRIBUTED LEDGER ARCHIVING AND SIZE MANAGEMENT

BACKGROUND

Distributed ledgers, such as blockchains, provide for the decentralized and secure storage of data. Distributed ledgers may further provide for the immutability of recorded data, as data may not be altered once recorded to a distributed ledger. Organizations or other entities may store relatively large amounts of data, such as operational data, user data, etc.

DETAILED DESCRIPTION OF EXAMPLE EMBODIMENTS

The following detailed description refers to the accompanying drawings. The same reference numbers in different drawings may identify the same or similar elements.

Distributed ledgers, such as blockchains, may provide for a decentralized, immutable mechanism by which data may be recorded and/or retrieved. The immutability of distributed ledgers (referred to herein simply as "ledgers") may cause such ledgers to grow in size indefinitely. Nodes, validators, or other participants of such ledgers may accordingly have ever-increasing storage resource demands in order to securely maintain and/or otherwise participate in the maintenance or provenance of such ledgers. In some situations, maintaining such ledgers may be unnecessary, such as where the data stored in the ledger has no value after a period of time.

Embodiments described herein provide for a reduced amount of storage resources required to maintain data using ledger techniques, such as blockchain techniques. As discussed herein, for example, different ledgers, blockchains, channels, etc. may be associated with different ledger attributes. Ledger attributes may specify criteria, conditions, etc., where data to be recorded using ledger techniques may be recorded to a particular ledger that is associated with criteria, conditions, etc. that are met by the data. For example, ledger attributes may specify a particular time window, such as a particular month, a particular year, etc., and data that has a creation date (or other suitable reference date) that falls within a time window associated with a particular ledger may be recorded to that particular ledger. As further discussed herein, each ledger may be associated with a set of archival parameters, based on which the ledger may be removed, deleted, archived, etc. For example, a particular ledger may be associated with a set of archival parameters that specify a date on which the particular ledger should be deleted.

In this manner, ledgers that have become "stale" or that store old data that is unlikely to be accessed may be removed, without impacting the immutability and trust associated with other ledgers (e.g., newer ledgers that store "fresh" data or newer data that is more likely to be accessed). The removal of the ledgers for which archival parameters have been met (e.g., ledgers associated with "stale" or old data) may free up storage resources of nodes, validators, and/or other participants of the ledger, which maintain and/or provide the ledger.

Figure 1:
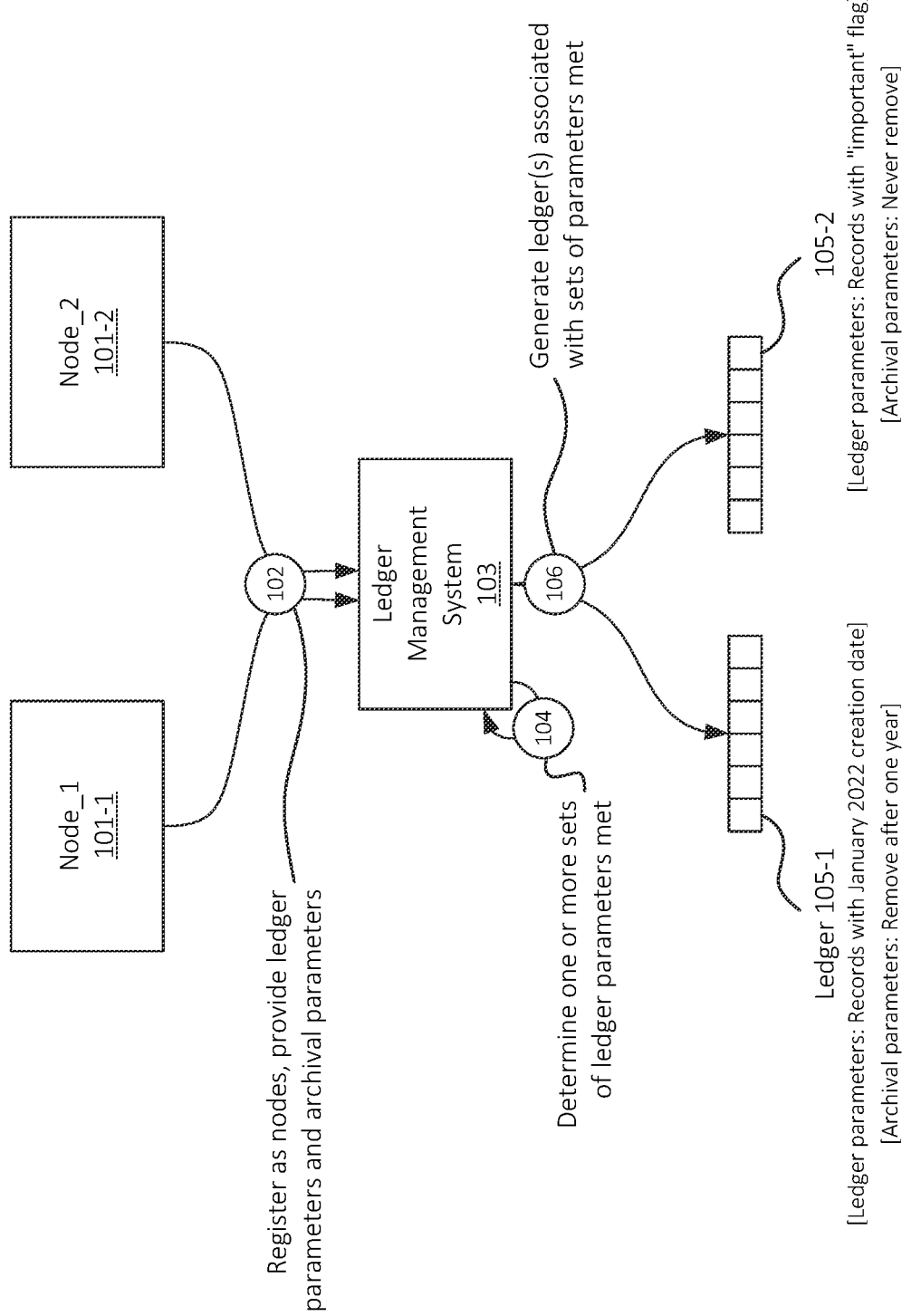
FIG. 1 illustrates an example creation of one or more distributed ledgers that are associated with different ledger parameters and/or archival parameters, in accordance with some embodiments.

As shown in FIG. 1, for example, two or more nodes 101 (e.g., nodes 101-1 and 101-2) may register (at 102) as nodes associated with Ledger Management System ("LMS") 103. LMS 103 may be or may include a ledger framework (e.g., the Hyperledger framework), a decentralized application ("dApp"), or other device or system that is able to create one or more ledgers, delete one or more ledgers, interact with one or more ledgers (e.g., record data to such ledgers), deploy smart contracts to one or more ledgers, access one or more ledgers (e.g., read, explore, crawl, etc. such ledgers), serve as an interface between one or more nodes or clients (e.g., clients associated with nodes 101 and/or other clients) and one or more ledgers, register nodes or clients, and/or perform other suitable functions. For example, LMS 103 may generate, provide, and/or validate one or more clients, addresses, wallets, private keys, etc. associated with nodes 101-1 and 101-2. As such, nodes 101-1 and 101-2 may be or may include nodes, validators, peers, etc. with respect to one or more ledgers created by LMS 103, as discussed herein. For example, nodes 101-1 and 101-2 may participate in a consensus mechanism in which ledger operations, such as the creation of a ledger, the removal of a ledger, the recordation of data to a ledger, etc. is validated, signed, etc. by nodes 101-1 and 101-2.

As further shown, nodes 101-1 and/or 101-2 may provide (at 102) a set of ledger parameters and/or archival parameters. For example, node 101-1 and/or node 101-2 may provide such parameters to LMS 103 (e.g., via an application programming interface ("API"), a dApp, a web portal, or other suitable type of communication pathway), and such parameters may be validated by nodes associated with LMS 103 (e.g., nodes 101-1, 101-2, and/or one or more other nodes). Additionally, or alternatively, some other device or system may provide the parameters to LMS 103, and such parameters may be validated by nodes associated with LMS 103 prior to implementation of the parameters as described herein.

As discussed above, ledger parameters may specify conditions, criteria, etc. that may be associated with particular ledgers created by LMS 103 and ultimately maintained by nodes 101. In the examples described herein, a first set of ledger parameters may specify a monthly interval, based on which a first ledger may be associated with a particular month, a second ledger may be associated with the next month, a third ledger may be associated with month after the next month, etc. Further in the examples described herein, a second set of ledger parameters may specify one or more flags or indicators, such as an "important" flag. As discussed below, LMS 103 may receive data to be recorded to one or more ledgers, identify attributes of the data to be recorded, and record such data to one or more appropriate ledgers (e.g., one or more ledgers associated with ledger parameters that are met by the attributes of the data). In practice, other types of ledger parameters may be specified based on any suitable type of conditions, criteria, etc.

The ledger parameters may also be used by LMS 103 to determine when to generate a new ledger that is associated with a particular set of ledger parameters. For example, assume that the ledger parameters (provided at 102) specify a monthly interval. LMS 103 may determine (at 104) that a new month has begun (e.g., at 12:01 AM on Jan. 1, 2022). LMS 103 may accordingly determine that a new ledger should be created, where such is associated with the month of January 2022. As such, LMS 103 may create (at 106) ledger 105-1, which is associated with the month of January 2022. In the examples discussed herein, data to be recorded to one or more ledgers 105 may be "associated with" a given date if such date is specified in the data, such as a creation date associated with the data. In some embodiments, the date may be indicated or associated with such data in some other manner, such as a "last modified" date, a "received on" date, or some other suitable date. As further shown, ledger 105-1 may be associated with archival parameters indicating that ledger 105-1 should be removed after one year (e.g., on or about Jan. 1, 2023).

As further shown in this example, LMS 103 may also generate (at 106) ledger 105-2, which is associated with data that includes an "important" flag. For example, as discussed herein, data that includes the "important" flag and is received by LMS 103 for recordation to one or more ledgers 105, may be recorded to ledger 105-2. In this example, the archival parameters for ledger 105-2 may specify that ledger 105-2 should never be removed, or ledger 105-2 may not be associated with a set of archival parameters.

Figure 2:
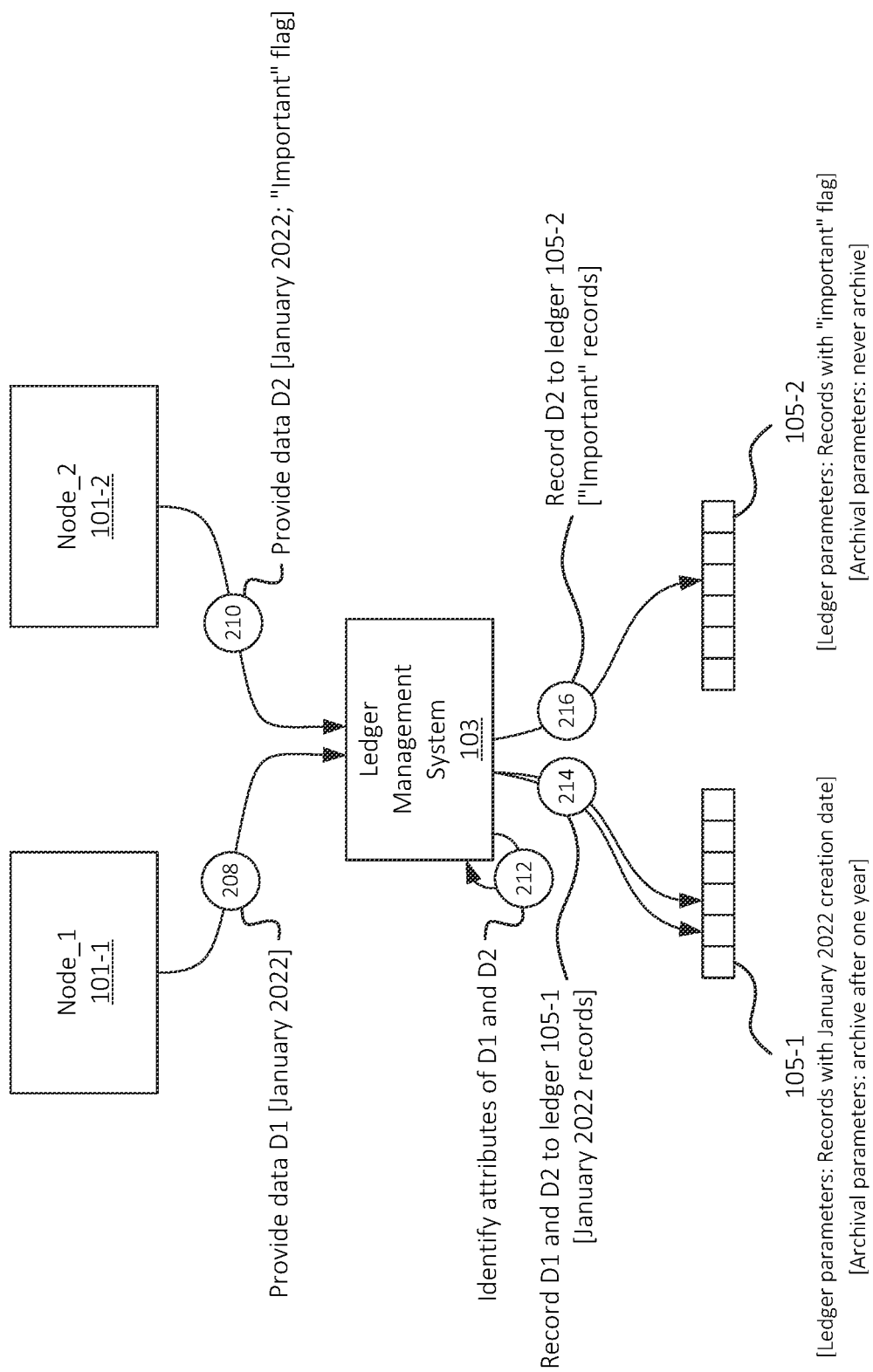
FIG. 2 illustrates the recordation of data to one or more ledgers based on attributes of the data and the ledger parameters associated with the one or more ledgers, in accordance with some embodiments.

As shown in FIG. 2, LMS 103 may receive (at 208) a particular data item D1 for recordation to one or more ledgers. For example, LMS 103 may receive data item D1 from node 101-1. In some embodiments, LMS 103 may receive data item D1 from some other node or client that is authorized to provide data for recordation to one or more ledgers 105 (e.g., a node or client that has registered with LMS 103). In this example, data item D1 has a creation date of January 2022, which may be specified in the data itself, may be provided as metadata, or may otherwise be indicated in conjunction with the providing of the data.

LMS 103 may also receive (at 210) data item D2 for recordation to one or more ledgers, such as from node 101-2 and/or some other source (e.g., another node, client, etc.). Data item D2 may also have a January 2022 creation date. Data item D2 may also be associated with an "important" flag, which may be specified in header information associated with data item D2, metadata associated with data item D2, and/or as a "body" or payload of data item D2.

LMS 103 may identify (at 212) attributes of data items D1 and D2. For example, in some embodiments, LMS 103 may analyze metadata associated with the provided data items, may analyze header information associated with the provided data items, and/or may analyze payload information or content of the data items themselves in order to identify attributes of the data items (e.g., the January 2022 creation date of data items D1 and D2, as well as the "important" flag associated with data item D2 in this example).

Based on identifying the attributes of data items D1 and D2, LMS 103 may record the data items to one or more ledgers 105. For example, LMS 103 may record (at 214) data items D1 and D2 to ledger 105-1, based on the ledger parameters associated with ledger 105-1 indicating that ledger 105-1 is associated with data items with a January 2022 creation date and further based on determining that attributes of data items D1 and D2 indicate that these data items are associated with a January 2022 creation date. LMS 103 may also record (at 216) data item D2 to ledger 105-2, based on the ledger parameters associated with ledger 105-2 indicating that ledger 105-2 is associated with data items with an "important" flag and further based on determining that attributes of data item D2 indicate that data item D2 is associated with the "important" flag. In other words, data item D2 may be recorded to both ledgers 105-1 and 105-2 in this example. As discussed below, the recordation of the same data item to multiple ledgers 105 may be useful in situations where a particular one of the ledgers 105 is deleted (e.g., due to becoming "stale," old, or otherwise meeting one or more conditions specified by archival parameters), but where the data item may still have some relevance or other measure of desirability beyond other data items recorded to the particular ledger 105.

Figure 3:
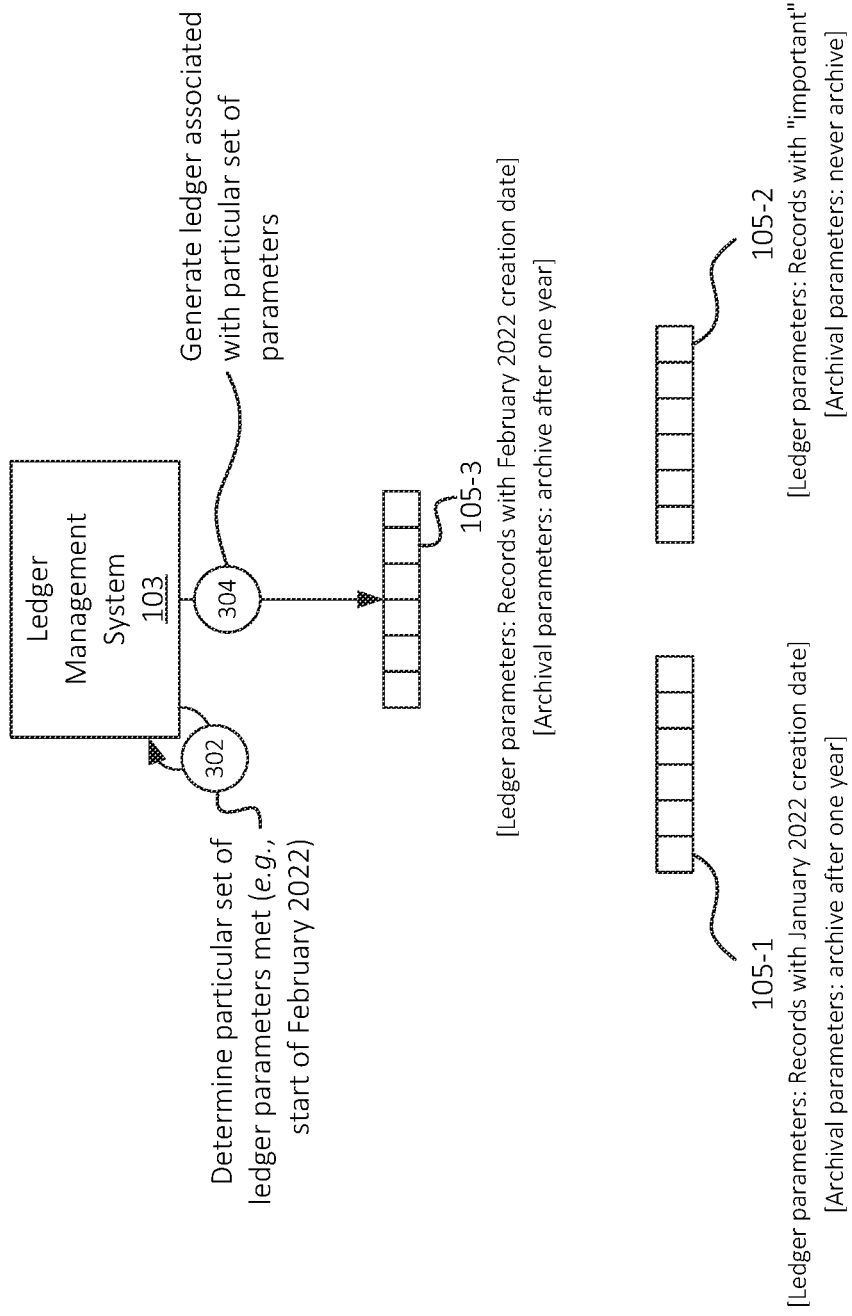
FIG. 3 illustrates an example creation of one or more distributed ledgers based on determining that a set of ledger parameters have been met, in accordance with some embodiments.

As shown in FIG. 3, LMS 103 may automatically create one or more ledgers 105 based on identifying that ledger parameters (e.g., as provided at 102 by one or more nodes 101 and/or other sources) are met. For example, at the beginning of February 2022 (e.g., one month after the creation of ledger 105-1, associated with data items with a January 2022 creation date), LMS 103 may determine (at 302) that a new ledger should be generated in order to maintain data items with a February 2022 creation date. In some embodiments, the ledger parameters (e.g., as specified at 102) may explicitly include triggers based on which a series of ledgers should be created (e.g., at the beginning of every month, at the beginning of every year, etc.).

In some embodiments, when such series are specified by ledger parameters, a next ledger in the series may reference a previous ledger in the series, and/or the previous ledger in the series may reference the next ledger in the series. For example, in the example of FIG. 3, ledger 105-3 (e.g., associated with February 2022 data items) may include a reference to ledger 105-1 (e.g., associated with January 2022 data items), such as a hash, Merkle proof, or some other representation of some or all of the data stored in ledger 105-1. In some embodiments, the reference to ledger 105-1 may include an identifier, name, or other reference to ledger 105-1 (e.g., as maintained by Ledger Management System 103). Additionally, or alternatively, ledger 105-1 may include a reference to ledger 105-3, such as an identifier, name, etc. of ledger 105-3. Such indications may indicate, for example, that ledgers 105-1 and 105-3 are associated with a series of ledgers, and that 105-1 is a ledger that immediately precedes ledger 105-3 in the series (and/or that ledger 105-3 immediately follows ledger 105-1 in the series).

In some embodiments, LMS 103 may identify conditions under which ledger parameters are inapplicable and/or under which ledger parameters may be applicable, and may automatically generate ledgers based on identifying that ledger parameters have become potentially applicable. For example, during the month of January 2022, LMS 103 may determine that no data items with a creation date of February 2022 will be received (e.g., based on the logical impossibility of receiving data items created in the future), and may forgo creating a ledger to record data items with a creation date of February 2022. On the other hand, once February 2022 begins, LMS 103 may determine that it is possible to receive data items with a creation date of February 2022, and may accordingly generate (at 304) ledger 105-3, with ledger parameters indicating that ledger 105-3 stores records associated with data items with a February 2022 creation date.

In some embodiments, LMS 103 may forgo creating a ledger (such as ledger 105-3) until actually receiving a data item matching a particular set of ledger parameters. For example, in some embodiments, LMS 103 may generate (at 304) ledger 105-3 after receiving a data item, with a creation date of February 2022, for recordation to one or more ledgers.

Once ledger 105-3 is generated (at 304), LMS 103 may maintain ledgers 105-1, 105-2, and 105-3. For example, LMS 103 may maintain information indicating that ledgers 105-1, 105-2, and 105-3 are active, established, or should otherwise be maintained by nodes that have registered with LMS 103, such as nodes 101-1 and 101-2. For example, registered nodes (such as nodes 101-1 and 101-2) may be "subscribed" to one or more channels, may receive a notification from LMS 103, and/or may otherwise receive an indication that ledger 105-3 has been generated. Accordingly, such registered nodes may maintain a copy of ledger 105-3 (e.g., in addition to ledgers 105-1 and 105-2), may participate in consensus mechanisms associated with ledgers 105-1, 105-2, and 105-3, and/or may perform other functions to maintain the provenance of ledgers 105-1, 105-2, and 105-3.

Figure 4:
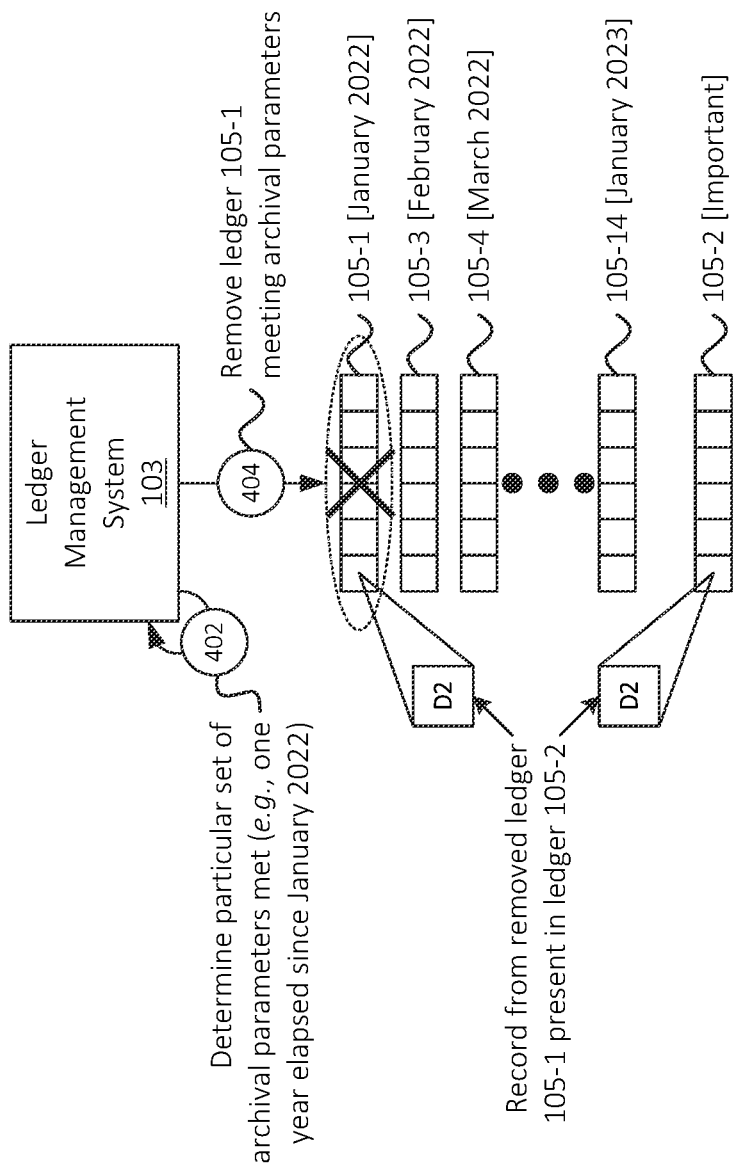
FIGS. 4 and 5 illustrate examples of the removal of a distributed ledger based on determining that a corresponding set of archival parameters have been met, in accordance with some embodiments.

Over the course of time, LMS 103 may continue to generate additional ledgers 105 in a manner similar to that described above with respect to FIG. 3. For example, as shown in FIG. 4, LMS 103 may have additionally generated ledgers 105-4 through 105-14, which may each be associated with a particular month (e.g., March 2022, April 2022, etc.). That is, as of January 2023 (e.g., as depicted in FIG. 4), LMS 103 may have generated a monthly ledger for each month that has elapsed, in accordance with ledger parameters provided (at 102) by one or more suitable sources.

Further, LMS 103 may determine (at 402) that archival parameters associated with ledger 105-1 have been met. For example, as discussed above, ledger 105-1 (as well as ledgers 105-3 through 105-14) may be associated with archival parameters indicating that such ledgers 105 should be removed after one year (e.g., ledger 105-1 which is associated with January 2022 data items should be removed in January 2023, ledger 105-3 which is associated with February 2022 data items should be removed in February 2023, and so on).

Based on determining that the archival parameters associated with ledger 105-1 have been met, LMS 103 may remove (at 404) ledger 105-1. For example, LMS 103 may remove ledger 105-1 from an index or master list of ledgers associated with nodes 101-1 and 101-2 (and/or other nodes, clients, etc. that are subscribed to or are otherwise associated with one or more channels associated with ledgers 105-1 through 105-14). Additionally, or alternatively, LMS 103 may output a notification to nodes 101-1 and 101-2, and/or nodes 101-1 and 101-2 may otherwise determine that ledger 105-1 has been removed.

Figure 5:
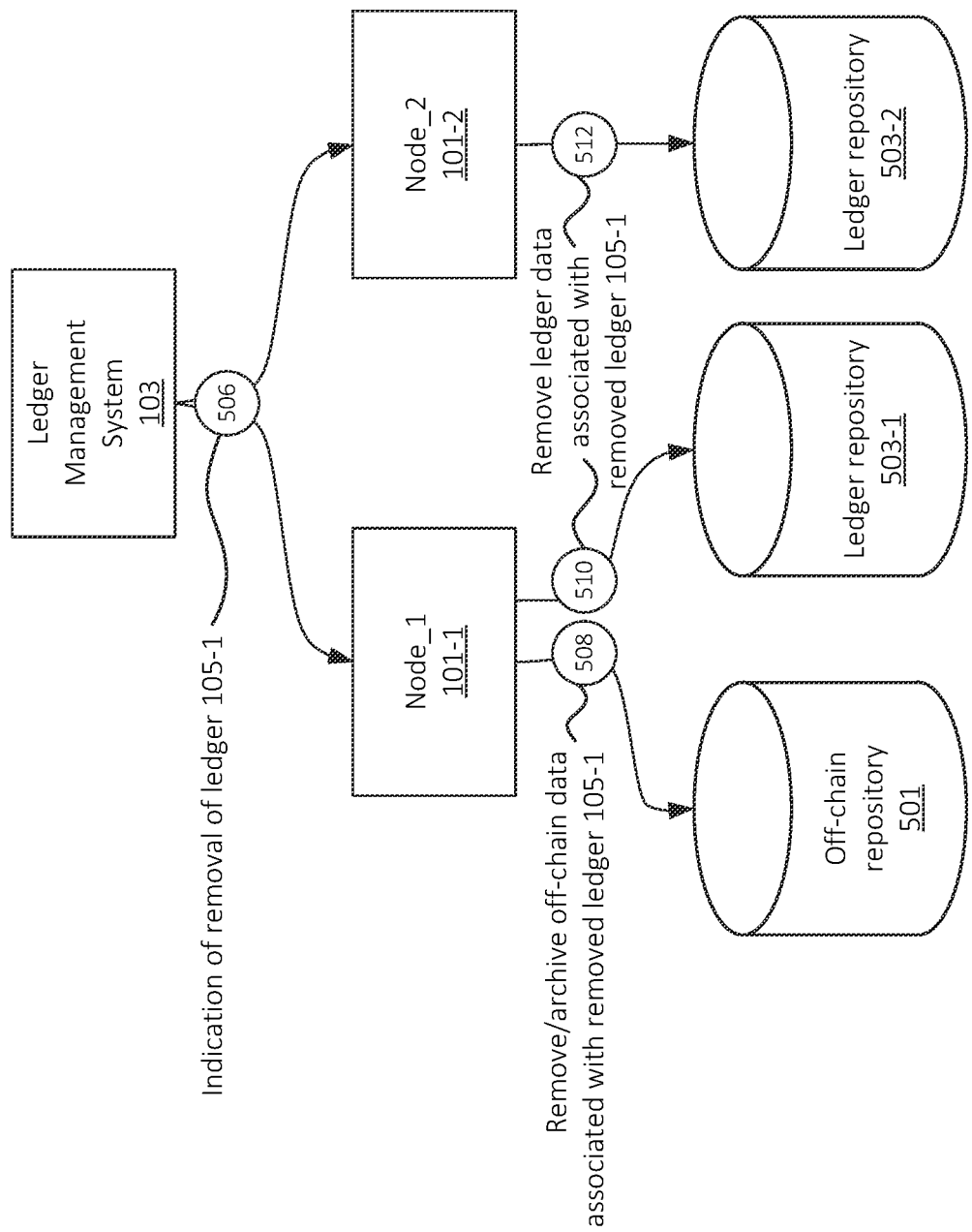

For example, as shown in FIG. 5, LMS 103 may output (at 506) an indication of the removal (at 404) of ledger 105-1 to nodes 101-1 and 101-2. Additionally, or alternatively, as discussed above, nodes 101-1 and 101-2 may otherwise determine that ledger 105-1 has been removed. In some embodiments, LMS 103 may generate a new peer, channel, etc. associated with non-removed ledgers 105-2 through 105-14, and may provide such new peer, channel, etc. to nodes 101-1 and 101-2, which may effectively remove ledger 105-1.

Based on the removal of ledger 105-1, node 101-1, node 101-2, and/or one or more other devices or systems may perform one or more "off-chain" operations (e.g., operations that do not include modifying or interacting with ledgers 105 and/or LMS 103). For example, node 101-1 may maintain information in off-chain repository 501 that is referenced by or is otherwise associated with data items stored in one or more ledgers 105. As one example, the data items stored in ledgers 105 may include indexes, identifiers, pointers, Uniform Resource Locators ("URLs"), etc., that may reference video content, audio content, encrypted records, hash values, and/or other data stored in off-chain repository 501. In this manner, the size of data stored in off-chain repository 501 (e.g., as referenced by data items recorded to ledgers 105) may be magnitudes larger than the size of the data items recorded to ledgers 105.

When ledger 105-1 is removed, node 101-1 may remove, archive, etc. (at 508) data referenced by records in ledger 105-1. For example, node 101-1 may delete video content, audio content, and/or other data stored in off-chain repository 501 that is referenced by records in ledger 105-1 (e.g., where such records include pointers, links, etc. to such data). Node 101-1 may, for example, analyze ledger 105-1 to identify such pointers, links, etc. included in ledger 105-1, and may remove the referenced data from off-chain repository 501 on the basis of such pointers, links, etc.

In some embodiments, node 101-1 may refrain from removing data stored by off-chain repository 501 that is referenced in both a removed ledger and one or more ledgers that are not removed. For example, as discussed above and as shown in FIG. 4, the same data item D2 may be recorded to ledgers 105-1 and 105-2. Assuming that this data item D2 references data stored in off-chain repository 501, node 101-1 may refrain from removing (at 508) the data referenced by data item D2 from off-chain repository 501, based on data item D2 remaining in ledger 105-2 after ledger 105-1 (which also references such data stored in off-chain repository 501) is removed.

In some embodiments, removing, archiving, etc. (at 508) the off-chain data may include erasing files or other data stored by one or more storage devices associated with off-chain repository 501. As such, storage resources of off-chain repository 501, which were allocated to storing the off-chain data, may be made available for use, thus reducing the consumption of such storage resources. In some embodiments, archiving (at 508) the off-chain data may include compressing the off-chain data using one or more suitable data compression techniques (e.g., according to one or more codecs), moving the data to a different type of storage medium (e.g., from a flash memory device to a platter or tape-based storage drive), moving the data to a different storage system (e.g., from an on-site system to a cloud-based system), etc.

As further shown in FIG. 5, node 101-1 may include and/or may be communicatively coupled to ledger repository 503-1, which may maintain information related to serving as a node associated with LMS 103. Such information may include, for example, copies of ledgers 105 and/or other data associated with ledgers 105. Similarly, node 101-2 may maintain and/or may be communicatively coupled to ledger repository 503-2, which may also maintain information related to serving as a node associated with LMS 103. Based on receiving (at 506) the indication of the removal of ledger 105-1, nodes 101-1 and 101-2 may remove (at 510 and 512) ledger data associated with ledger 105-1. As such, storage resources associated with ledger repositories 503-1 and 503-2 may be freed up, thus conserving the storage resources of ledger repositories 503-1 and 503-2.

Figure 6:
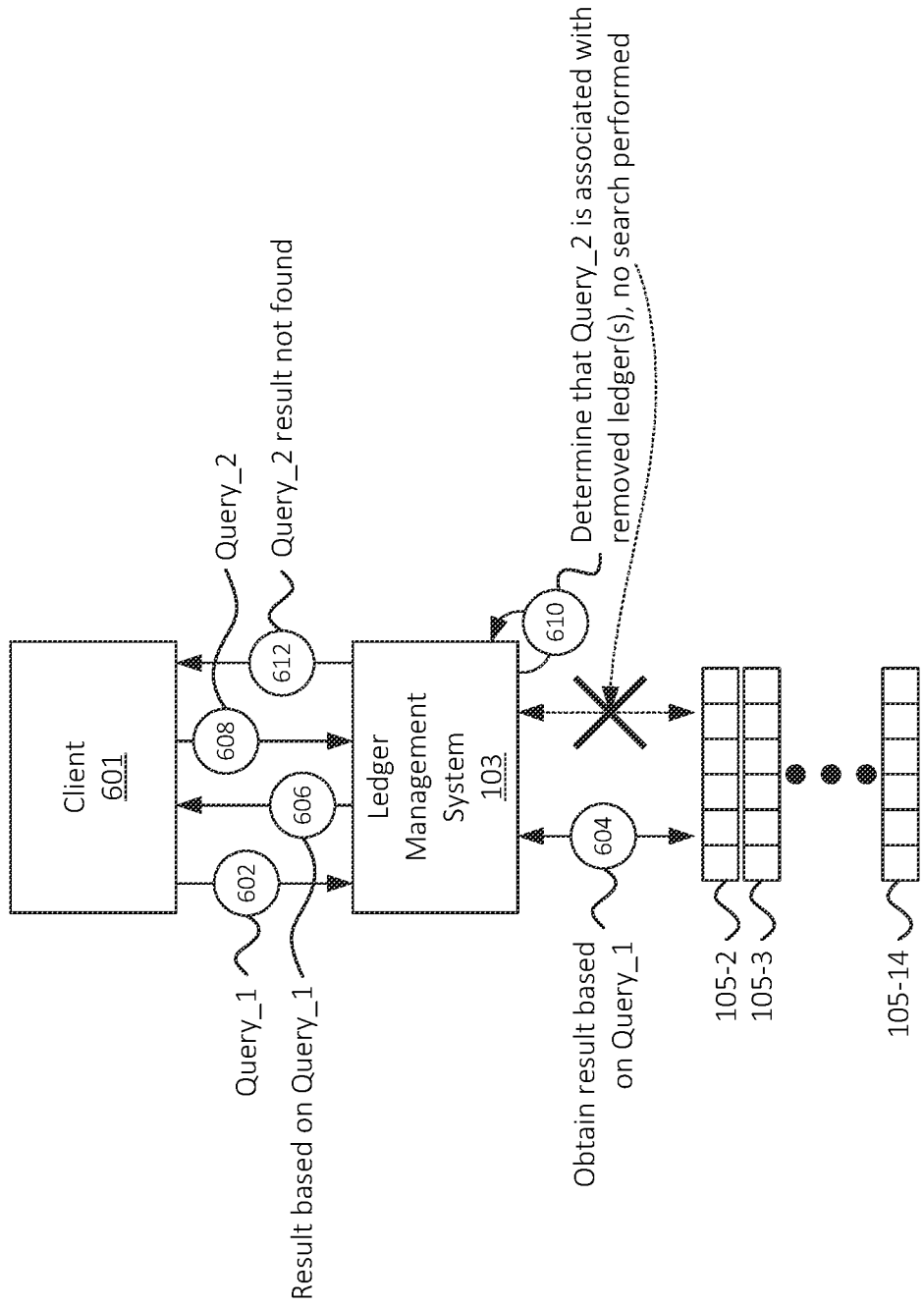
FIG. 6 illustrates example queries that may be performed with respect to one or more distributed ledgers, in accordance with some embodiments.

As other ledgers 105 are still maintained (e.g., ledgers 105-2 through 105-14), information that is stored in the other ledgers may be able to be retrieved or otherwise accessed. For example, as shown in FIG. 6, LMS 103 may respond to queries (e.g., from client 601 or some other device or system that has registered with LMS 103 and/or is otherwise authorized to provide queries to LMS 103) with information stored in one or more ledgers 105. For example, LMS 103 may receive (at 602) a first query from client 601. LMS 103 may obtain (at 604) one or more results based on the first query. For example, LMS 103 may search records associated with one or more maintained ledgers 105-2 through 105-14. That is, in situations where one or more ledgers were previously removed in accordance with embodiments described above (e.g., the example removal of ledger 105-1), the obtaining (at 604) of the results may not include a search of the ledger 105-1.

In some embodiments, LMS 103 or some other device or system may maintain "world state" information based on information stored in some or all of ledgers 105-2 through 105-14. For example, LMS 103 may maintain a "flat" database or other type of data structure based on some or all of the information stored in ledgers 105-2 through 105-14. In instances where different values for the same attribute, label, etc. is different, the world state may include a particular value for the particular attribute, label, etc. that is the most up-to-date value and/or is precedential over the other values based on one or more other factors. When searching for results based on queries, LMS 103 may search the world state information in lieu of, or in addition to, searching through individual ledgers 105.

In some embodiments, the world state may indicate one or more ledgers 105 from which one or more values for a particular attribute, label, etc. were obtained. In this manner, the source of the information in the world state may be traceable to source data, including changes to such values. In instances where a particular ledger 105 that is the source of information in the world state is removed, the indication of such ledger 105 may be used to investigate or otherwise identify the deleted data (e.g., using off-chain techniques).

In some embodiments, LMS 103 may perform a "pre-computation" or "pre-processing" operation to determine which ledger(s) to search based on the query. For example, LMS 103 may analyze the query to determine one or more attributes that match or are otherwise associated with one or more ledger parameters. For example, LMS 103 may determine that the query indicates a date filter, requesting data items associated with a creation date of February 2022. In this situation, LMS 103 may search ledger 105-3 (e.g., associated with February 2022 data items) without searching ledgers 105-4 through 105-14 (e.g., associated with March 2022 through January 2023 data items). In this situation, LMS 103 may further search ledger 105-2 (e.g., associated with data items with an "important" flag), as ledger 105-2 may not be associated with data items with a particular creation date restriction. That is, based on the ledger parameters of ledger 105-2, ledger 105-2 may potentially include records pertaining to data items that were created in February 2022, as specified by the date filter associated with the query.

Further assume that LMS 103 receives (at 608) a second query from client 601 and/or from some other source. Assume that this second query includes a date filter specifying data items with a January 2022 creation date. LMS 103 may determine (at 610) that this second query is associated with a ledger that was removed (e.g., ledger 105-1). For example, since ledger 105-1 was removed and was associated with data items with a January 2022 creation date, LMS 103 may determine (at 610) that the second query is associated with removed ledger 105-1. LMS 103 may accordingly forgo searching some or all of ledgers 105-2 through 105-14 based on determining that the second query is associated with removed ledger 105-1. Additionally, or alternatively, LMS 103 may search ledger 105-2 (e.g., which does not have restrictions on creation dates), but may forgo searching ledgers 105-3 through 105-14, which are associated with creation dates that would not satisfy the filter indicated in the second query.

Forgoing performing (at 610) the search of one or more ledgers 105 may conserve processing resources, time, or other resources associated with LMS 103. For example, LMS 103 may be able to determine that the result is not available in ledgers 105-2 through 105-14 (or 105-3 through 105-14) without performing an actual search of such ledgers 105. That is, based on attributes of the second query and based on ledger parameters associated with ledgers 105, LMS 103 may be able to determine that such ledgers 105 do not include records that may satisfy the query.

LMS 103 may indicate (at 612) that no result was found based on the second query. For example, LMS 103 may have found no results based on not performing any searches of remaining ledgers 105. Additionally, or alternatively, LMS 103 may have searched one or more remaining ledgers 105 but not all remaining ledgers 105 (e.g., may have searched ledger 105-2 associated with "important" data items but not ledgers 105-3 through 105-14 associated with respective time windows), and may have found no results. In some embodiments, LMS 103 may indicate (at 612) that the query is associated with one or more attributes that meet ledger parameters of one or more ledgers that were removed. For example, LMS 103 may indicate that records associated with the creation date filter specified in the second query were removed. A requestor associated with the query may be able to identify or infer that the lack of results may be due to the deletion of such records, and may not necessarily affirmatively indicate that the result does not exist. In such a circumstance, the requestor may be able to communicate with one or more external devices or systems (e.g., via off-chain communications) to potentially obtain results to the second query.

Figure 7:
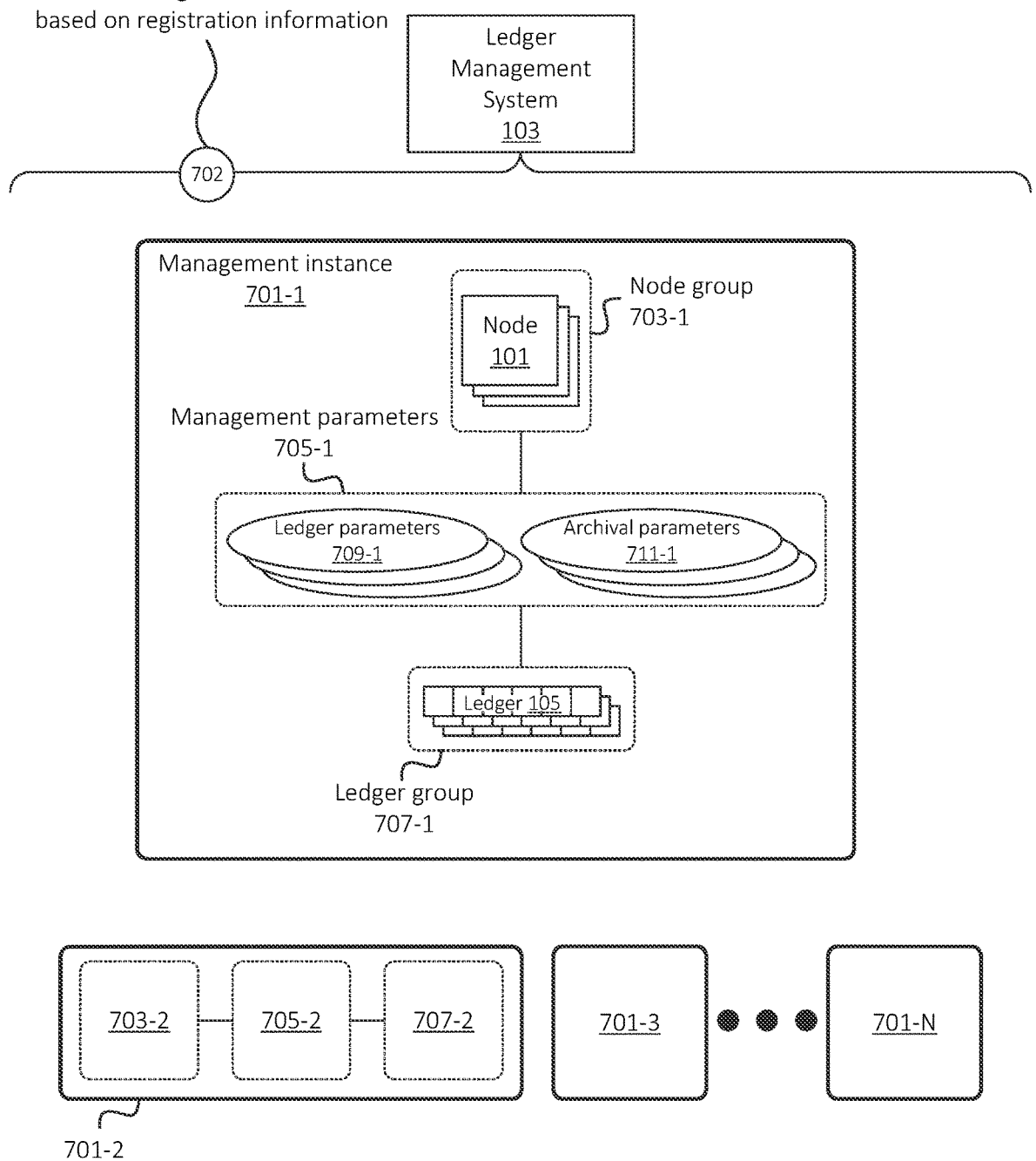
FIG. 7 illustrates an example of management instances, in accordance with some embodiments.

Examples discussed above are provided in the context of a particular set of ledgers 105 that are maintained by a particular set of nodes 101, and that are generated or removed based on a particular set of ledger parameters and/or archival parameters. In some embodiments, as shown in FIG. 7, LMS 103 may maintain (at 702) multiple management instances 701, where each management instance 701 includes a particular node group 703, set of management parameters 705, and ledger group 707.

When registering with LMS 103, each node 101 may register as being associated with a particular management instance 701, and/or LMS 103 may otherwise determine a particular management instance 701 associated with each node 101. For example, nodes 101 that are associated with different groups, categories, organizations, etc. may be associated with different management instances 701. In this manner, different nodes 101 may have access to different ledgers 105, without having access to other ledgers 105. As such, management instances 701 may each be isolated or "sandboxed" with respect to each other.

A first management instance 701-1 may include a first node group 703-1, which may include a particular set of nodes 101. Management parameters 705-1, associated with management instance 701-1, may have been provided, validated, signed, etc. by nodes 101 of node group 703-1. As discussed above, management parameters 705-1 may include ledger parameters 709-1 and archival parameters 711-1, which may indicate parameters related to ledger creation, ledger maintenance (e.g., criteria based on which particular data items should be recorded to certain ledgers 105), and/or ledger removal. Ledger group 707-1 may include a set of ledgers 105 that were created based on management parameters 705-1. For example, ledgers 105 of ledger group 707-1 may include ledgers created based on ledger parameters 709-1, and that have not been removed based on archival parameters 711-1.

Similarly, management instance 701-1 may include an association between node group 703-2, management parameter 705-1 (which may include ledger parameters 709-2 and 711-2), and ledger group 707-2. LMS 103 may further maintain additional management instances 701, such as management instances 701-3 through 701-N, which may be independent and/or otherwise not "aware" of each other's existence.

Figure 8:
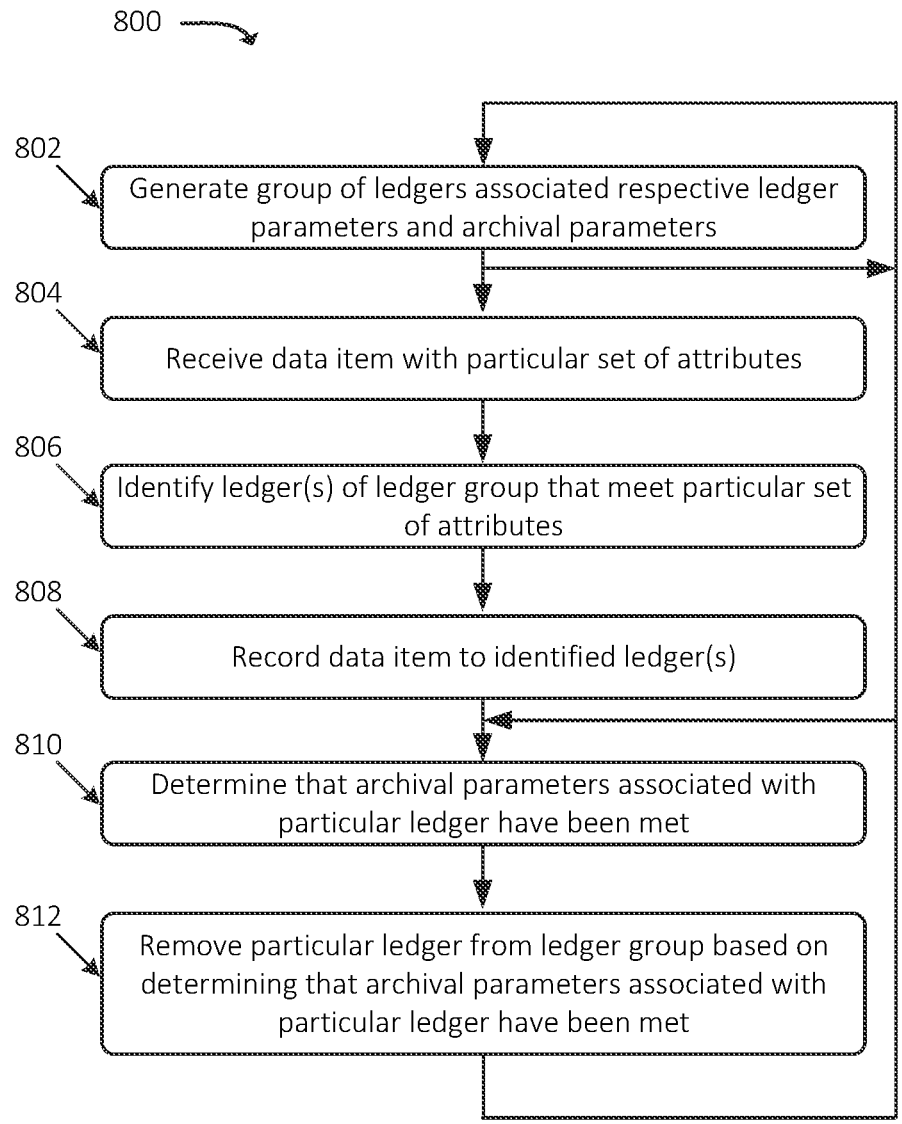
FIG. 8 illustrates an example process for managing the size of one or more distributed ledger groups, in accordance with some embodiments.

FIG. 8 illustrates an example process 800 for managing the size of one or more ledger groups, in accordance with some embodiments. In some embodiments, some or all of process 800 may be performed by LMS 103. In some embodiments, one or more other devices may perform some or all of process 800 in concert with, and/or in lieu of, LMS 103, such as one or more nodes 101 or other devices or systems.

As shown, process 800 may include generating (at 802) a group of ledgers associated with respective ledger parameters and archival parameters. For example, as discussed above, LMS 103 may receive ledger parameters 709 and archival parameters 711 from nodes 101 (e.g., a set of nodes 101 of a particular node group 703 associated with a particular management instance 701), and/or may receive consensus, validation, etc. of such parameters 709 and 711 from nodes 101. LMS 103 may receive such parameters 709 and 711 on an ongoing basis, and may maintain distinct sets of parameters 709 and 711 for different management instances 701.

As discussed above, ledger parameters 709 may include conditions, attributes, parameters, etc. based on which one or more ledgers 105 may be generated (e.g., automatically based on such parameters being met), and/or based on which data may be recorded to such ledgers 105. In some embodiments, ledger parameters 709 may include temporal parameters, such as an indication of one or more times or time windows with which a given ledger 105 is associated. In some embodiments, ledger parameters 709 may include other types of parameters other than temporal parameters, such as keywords, labels, categories, etc. As also discussed above, archival parameters 711 may include conditions, attributes, parameters, etc. based on which one or more ledgers 105 may be removed from the group 707 of ledgers. For example, archival parameters 711 may specify a rolling time window which, when attributes of a particular ledger 105 include temporal information that falls outside of the rolling time window (e.g., where the ledger 105 may have become old, "stale," aged, etc.), the particular ledger 105 should be removed. Additionally, or alternatively, archival parameters 711 may specify one or more times, dates, etc. at which ledgers 105 that include temporal information that falls within the one or more dates, times, etc. are removed from ledger group 707. For example, archival parameters 711 may specify or indicate times at which such ledgers 105 have become old, "stale," etc. In some embodiments, archival parameters 711 may include conditions that are not temporal in nature, such as conditions that are met or triggered based on radio frequency ("RF") conditions of a wireless network, load metrics associated with a RAN of a wireless network (e.g., quantity of connected UEs or other load metrics), the occurrence of a particular event, the output of an artificial intelligence/machine learning ("AI/ML") model, or other suitable triggers.

Process 800 may further include receiving (at 804) a data item with a particular set of attributes. For example, LMS 103 may receive, from a respective node 101 and/or other suitable source, a data item for recordation to the group 707 of ledgers. The attributes may include or may be based on metadata, header information, payload information or a body of the data item, or other suitable attributes. In some embodiments, the attributes may include temporal attributes, such as an indication of a particular date or time. Such particular date or time may be, for example, a creation date associated with the data item, a modification date associated with the data item, a date of an occurrence as indicated by the data item, or other suitable temporal information. In some embodiments, the attributes of the data item may include some other type of attributes, such as flags, identifiers, indicators, labels, etc.

Process 800 may additionally include identifying (at 806) one or more ledgers 105 of ledger group 707 that meet the particular set of attributes. For example, LMS 103 may identify a particular ledger 105 that is associated with temporal attributes that match temporal attributes of the data item, where such "match" may occur based on a time associated with the data item falling within a time window associated with the temporal attributes of ledger 105. In some embodiments, LMS 103 may identify a particular ledger 105 that is associated with other attributes (e.g., other than temporal attributes) that match particular attributes of the data item, where such "match" may occur based on an exact match of such attributes, or based on a measure of similarity of such attributes exceeding a threshold measure of similarity. Process 800 may also include recording (at 808) the data item to the identified ledger or ledgers 105.

Process 800 may further include determining (at 810) that archival parameters 711 associated with a particular ledger 105 have been met. For example, in the example of temporal parameters, LMS 103 may determine that the particular ledger 105 has aged beyond a threshold age based on archival parameters 711, may determine that a date or time window associated with the particular ledger 105 falls within a time window specified by archival parameters 711 as being associated with ledger removal, and/or may otherwise determine that the temporal archival parameters 711 have been met.

Process 800 may additionally include removing (at 812) the particular ledger 105 from ledger group 707 based on determining that archival parameters 711 associated with the particular ledger 105 have been met. For example, LMS 103 may remove a reference to the particular ledger 105 from an index of ledgers 105 associated with ledger group 707, may notify nodes 101 that maintain ledgers 105 of ledger group 707 that the particular ledger 105 has been removed, and/or may perform other suitable operations to remove the particular ledger 105. Nodes 101 may accordingly free up storage resources used to maintain the particular ledger 105, and/or may free up storage resources used to maintain off-chain data referenced by the particular ledger 105.

Figure 9:
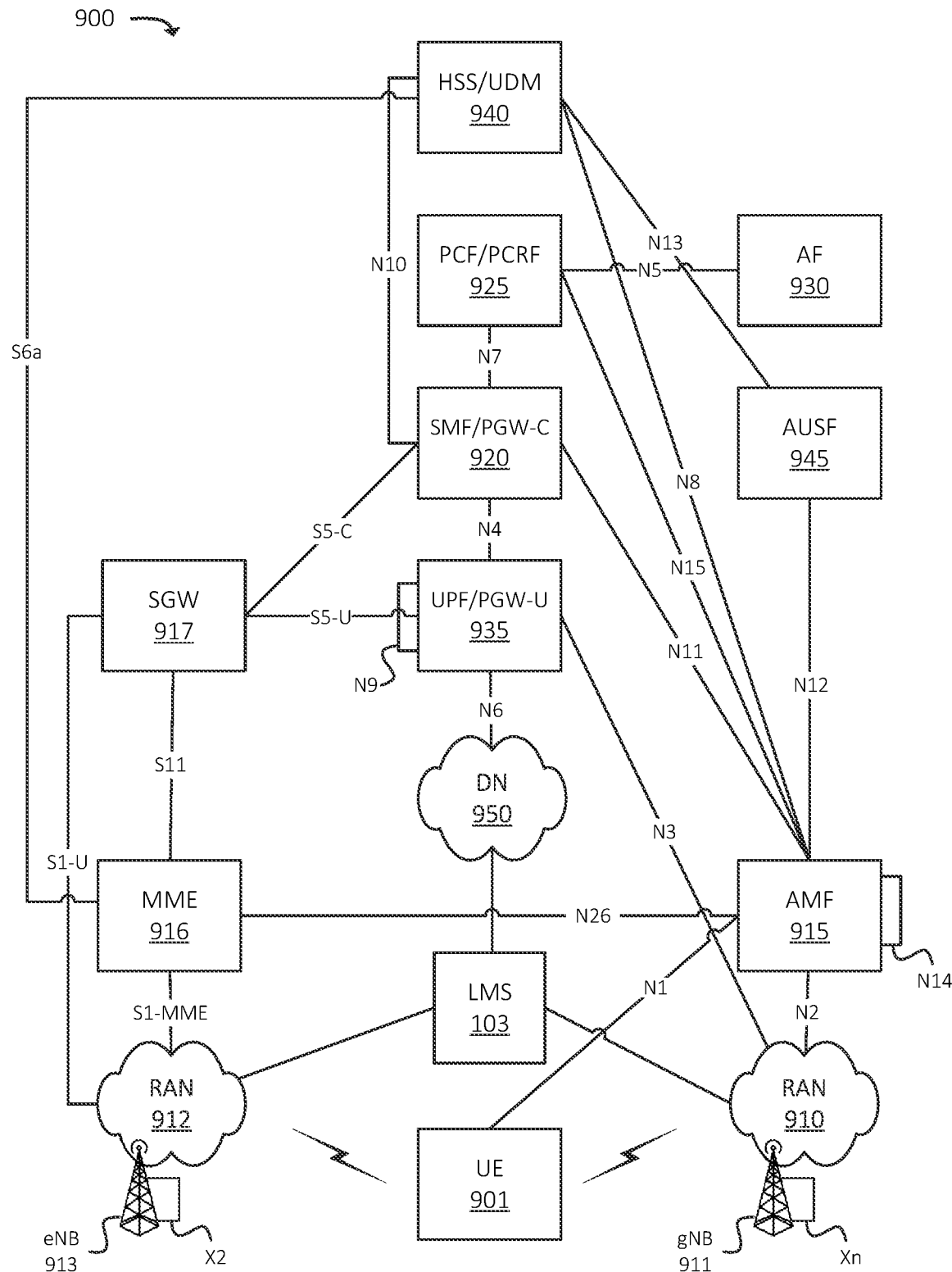
FIG. 9 illustrates an example environment in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 901, RAN 910 (which may include one or more Next Generation Node Bs ("gNBs") 911), RAN 912 (which may include one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. Environment 900 may also include one or more networks, such as Data Network ("DN") 950. Environment 900 may include one or more additional devices or systems communicatively coupled to one or more networks (e.g., DN 950), such as LMS 103.

The example shown in FIG. 9 illustrates one instance of each network component or function (e.g., one instance of SMF/PGW-C 920, PCF/PCRF 925, UPF/PGW-U 935, HSS/UDM 940, and/or AUSF 945). In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or AUSF 945, while another slice may include a second instance of SMF/PGW-C 920, PCF/PCRF 925, UPF/PGW-U 935, HSS/UDM 940, and/or AUSF 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 901 may include a computation and communication device, such as a wireless mobile communication device that is capable of communicating with RAN 910, RAN 912, and/or DN 950. UE 901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 901 may send traffic to and/or receive traffic (e.g., user plane traffic) from DN 950 via RAN 910, RAN 912, and/or UPF/PGW-U 935. In some embodiments, nodes 101, LMS 103, and/or one or more other devices or systems discussed herein may be, may include, or may be implemented by one or more UEs 901.

RAN 910 may be, or may include, a 5G RAN that includes one or more base stations (e.g., one or more gNBs 911), via which UE 901 may communicate with one or more other elements of environment 900. UE 901 may communicate with RAN 910 via an air interface (e.g., as provided by gNB 911). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, AMF 915, and/or one or more other devices or networks) and may communicate the traffic to UE 901 via the air interface.

RAN 912 may be, or may include, a LTE RAN that includes one or more base stations (e.g., one or more eNBs 913), via which UE 901 may communicate with one or more other elements of environment 900. UE 901 may communicate with RAN 912 via an air interface (e.g., as provided by eNB 913). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, SGW 917, and/or one or more other devices or networks) and may communicate the traffic to UE 901 via the air interface.

AMF 915 may include one or more devices, systems, Virtualized Network Functions ("VNFs"), Cloud-Native Network Functions ("CNFs"), etc., that perform operations to register UE 901 with the 5G network, to establish bearer channels associated with a session with UE 901, to hand off UE 901 from the 5G network to another network, to hand off UE 901 from the other network to the 5G network, manage mobility of UE 901 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, CNFs, etc., that perform operations to register UE 901 with the EPC, to establish bearer channels associated with a session with UE 901, to hand off UE 901 from the EPC to another network, to hand off UE 901 from another network to the EPC, manage mobility of UE 901 between RANs 912 and/or eNBs 913, and/or to perform other operations.

SGW 917 may include one or more devices, systems, VNFs, CNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, CNFs, etc., that gather, process, store, and/or provide information in a manner described herein. SMF/PGW-C 920 may, for example, facilitate the establishment of communication sessions on behalf of UE 901. In some embodiments, the establishment of communications sessions may be performed in accordance with one or more policies provided by PCF/PCRF 925.

PCF/PCRF 925 may include one or more devices, systems, VNFs, CNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, CNFs, etc., that receive, store, and/or provide information that may be used in determining parameters (e.g., quality of service parameters, charging parameters, or the like) for certain applications.

UPF/PGW-U 935 may include one or more devices, systems, VNFs, CNFs, etc., that receive, store, and/or provide data (e.g., user plane data). For example, UPF/PGW-U 935 may receive user plane data (e.g., voice call traffic, data traffic, etc.), destined for UE 901, from DN 950, and may forward the user plane data toward UE 901 (e.g., via RAN 910, SMF/PGW-C 920, and/or one or more other devices). In some embodiments, multiple UPFs 935 may be deployed (e.g., in different geographical locations), and the delivery of content to UE 901 may be coordinated via the N9 interface (e.g., as denoted in FIG. 9 by the line marked "N9" originating and terminating at UPF/PGW-U 935). Similarly, UPF/PGW-U 935 may receive traffic from UE 901 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, CNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 901.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 901 may communicate, through DN 950, with data servers, other UEs 901, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 901 may communicate.

Figure 10:
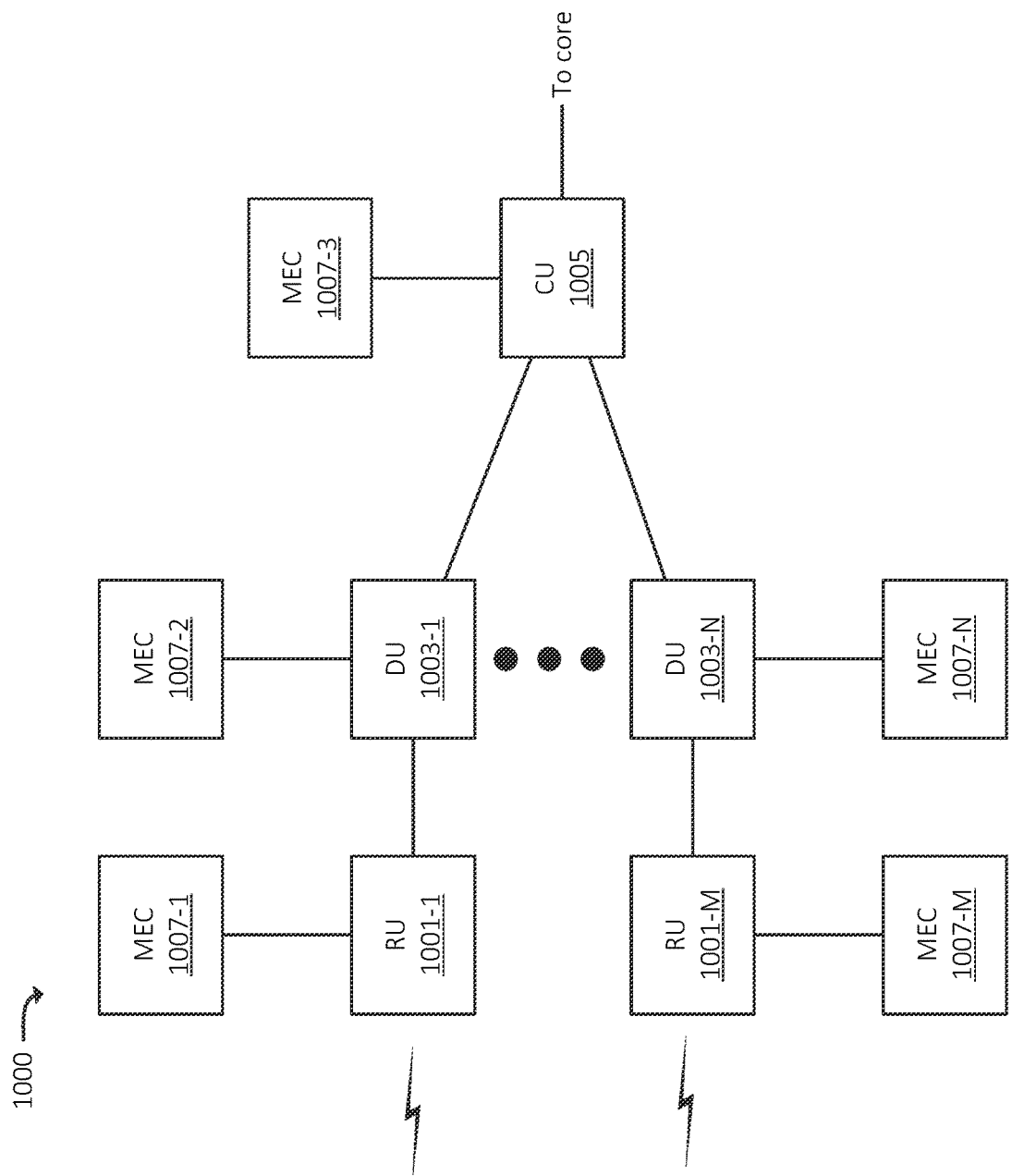
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910, RAN 912, or some other RAN). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 901 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 901, and may determine which DU(s) 1003 should receive the downlink traffic. DU 1003 may include one or more devices that transmit traffic between a core network (e.g., via CU 1005) and UE 901 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 901.

RU 1001 may include hardware circuitry (e.g., one or more RF transceivers, antennas, radios, and/or other suitable hardware) to communicate wirelessly (e.g., via an RF interface) with one or more UEs 901, one or more other DUs 1003 (e.g., via RUs 1001 associated with DUs 1003), and/or any other suitable type of device. In the uplink direction, RU 1001 may receive traffic from UE 901 and/or another DU 1003 via the RF interface and may provide the traffic to DU 1003. In the downlink direction, RU 1001 may receive traffic from DU 1003, and may provide the traffic to UE 901 and/or another DU 1003.

RUs 1001 may, in some embodiments, be communicatively coupled to one or more Multi-Access/Mobile Edge Computing ("MEC") devices, referred to sometimes herein simply as "MECs" 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 901, via a respective RU 1001.

For example, RU 1001-1 may route some traffic, from UE 901, to MEC 1007-1 instead of to a core network (e.g., via DU 1003 and CU 1005). MEC 1007-1 may process the traffic, perform one or more computations based on the received traffic, and may provide traffic to UE 901 via RU 1001-1. In this manner, ultra-low latency services may be provided to UE 901, as traffic does not need to traverse DU 1003, CU 1005, and an intervening backhaul network between DU network 1000 and the core network. In some embodiments, MEC 1007 may include, and/or may implement, some or all of the functionality described above with respect to nodes 101, LMS 103, UPF 935, and/or one or more other devices, systems, VNFs, CNFs, etc.

Figure 11:
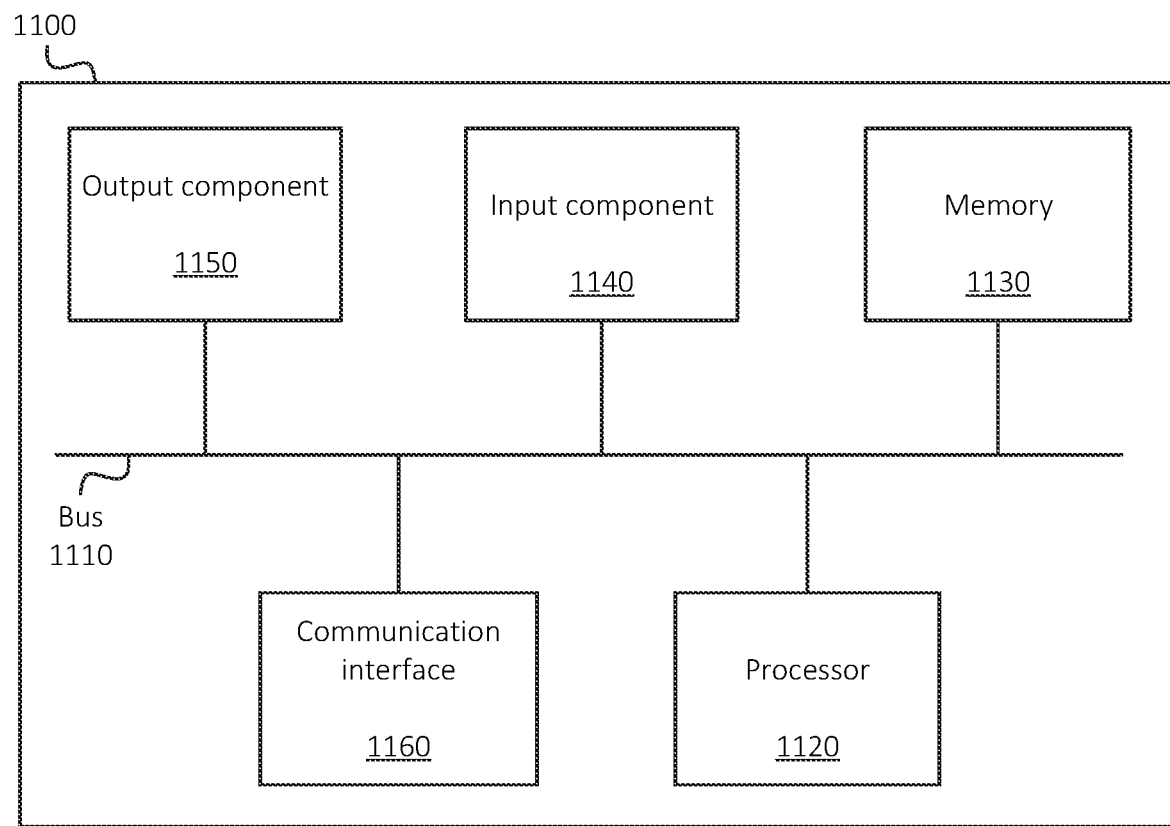
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or other receives or detects input from a source external to 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      generate a group of distributed ledgers that are each associated with a respective set of ledger parameters, wherein the group of distributed ledgers includes:
         a first distributed ledger that is associated with a first set of ledger parameters, and
         a second distributed ledger that is associated with a second set of ledger parameters;
      receive a data item that is associated with a particular set of attributes;
      identify that the particular set of attributes of the data item meet the first set of ledger parameters and the second set of ledger parameters;
      record the data item to the first and second distributed ledgers based on identifying that the particular set of attributes of the data item meet the first and second sets of ledger parameters;
      determine, after recording the data item to the first and second distributed ledgers, that a set of archival parameters, associated with the first distributed ledger, have been met; and
      remove the first distributed ledger from the group of distributed ledgers based on determining that the set of archival parameters, associated with the first distributed ledger, have been met, wherein the data item is retained in the second distributed ledger after the first distributed ledger is removed.

2. The device of claim 1, wherein the group of distributed ledgers is maintained by a plurality of nodes, wherein removing the first distributed ledger from the group of distributed ledgers includes notifying the plurality of nodes that the first ledger has been removed.

3. The device of claim 2, wherein the plurality of nodes maintain a set of ledger data associated with the group of distributed ledgers, wherein the plurality of nodes erase particular ledger data, associated with maintaining the first distributed ledger, based on receiving a notification that the first distributed ledger has been removed.

4. The device of claim 1,
   wherein the set of ledger parameters associated with the first distributed ledger includes temporal parameters,
   wherein the set of archival parameters associated with the first distributed ledger include one or more temporal conditions, and
   wherein determining that the set of archival parameters, associated with the first distributed ledger have been met includes determining that the temporal parameters associated with the first distributed ledger meet the one or more temporal conditions.

5. The device of claim 4,
   wherein the temporal parameters include a first time window,
   wherein the set of archival parameters include a second time window that is associated with data to be removed from the first distributed ledger, and
   wherein determining that the temporal parameters associated with the first distributed ledger meet the one or more temporal conditions includes determining that the first time window is within the second time window.

6. The device of claim 1,
   wherein the set of archival parameters associated with the first distributed ledger include a first time indicating staleness of data, and
   wherein determining that the set of archival parameters, associated with the first distributed ledger, have been met includes determining that ledger parameters associated with the first distributed ledger indicate that the first distributed ledger is associated with a second time that precedes the first time.

7. The device of claim 1, wherein the one or more processors are further configured to:
   receive a query;
   determine that one or more attributes of the query match one or more ledger parameters associated with the first distributed ledger that has been removed; and
   without performing a search on the other distributed ledgers of the group of distributed ledgers, provide a response to the query indicating that a result for the query was not found.

8. A non-transitory computer-readable medium, storing a plurality of processor-executable instructions to:
   generate a group of distributed ledgers that are each associated with a respective set of ledger parameters, wherein the group of distributed ledgers includes:

a first distributed ledger that is associated with a first set of ledger parameters, and
a second distributed ledger that is associated with a second set of ledger parameters;
receive a data item that is associated with a particular set of attributes;
identify that the particular set of attributes of the data item meet the first set of ledger parameters and the second set of ledger parameters;
record the data item to the first and second distributed ledgers based on identifying that the particular set of attributes of the data item meet the first and second sets of ledger parameters;
determine, after recording the data item to the first and second distributed ledgers, that a set of archival parameters, associated with the first distributed ledger, have been met; and
remove the first distributed ledger from the group of distributed ledgers based on determining that the set of archival parameters, associated with the first distributed ledger, have been met, wherein the data item is retained in the second distributed ledger after the first distributed ledger is removed.

9. The non-transitory computer-readable medium of claim 8, wherein the group of distributed ledgers is maintained by a plurality of nodes, wherein removing the first distributed ledger from the group of distributed ledgers includes notifying the plurality of nodes that the first ledger has been removed.

10. The non-transitory computer-readable medium of claim 9, wherein the plurality of nodes maintain a set of ledger data associated with the group of distributed ledgers, wherein the plurality of nodes erase particular ledger data, associated with maintaining the first distributed ledger, based on receiving a notification that the first distributed ledger has been removed.

11. The non-transitory computer-readable medium of claim 8,
wherein the set of ledger parameters associated with the first distributed ledger includes temporal parameters,
wherein the set of archival parameters associated with the first distributed ledger include one or more temporal conditions, and
wherein determining that the set of archival parameters, associated with the first distributed ledger have been met includes determining that the temporal parameters associated with the first distributed ledger meet the one or more temporal conditions.

12. The non-transitory computer-readable medium of claim 11,
wherein the temporal parameters include a first time window,
wherein the set of archival parameters include a second time window that is associated with data to be removed from the first distributed ledger, and
wherein determining that the temporal parameters associated with the first distributed ledger meet the one or more temporal conditions includes determining that the first time window is within the second time window.

13. The non-transitory computer-readable medium of claim 8,
wherein the set of archival parameters associated with the first distributed ledger include a first time indicating staleness of data, and
wherein determining that the set of archival parameters, associated with the first distributed ledger, have been met includes determining that ledger parameters associated with the first distributed ledger indicate that the first distributed ledger is associated with a second time that precedes the first time.

14. The non-transitory computer-readable medium of claim 8, wherein the processor-executable instructions further include processor-executable instructions to:
receive a query;
determine that one or more attributes of the query match one or more ledger parameters associated with the first distributed ledger that has been removed; and
without performing a search on the other distributed ledgers of the group of distributed ledgers, provide a response to the query indicating that a result for the query was not found.

15. A method, comprising:
generating a group of distributed ledgers that are each associated with a respective set of ledger parameters, wherein the group of distributed ledgers includes:
a first distributed ledger that is associated with a first set of ledger parameters, and
a second distributed ledger that is associated with a second set of ledger parameters;
receiving a data item that is associated with a particular set of attributes;
identifying that the particular set of attributes of the data item meet the first set of ledger parameters and the second set of ledger parameters;
recording the data item to the first and second distributed ledgers based on identifying that the particular set of attributes of the data item meet the first and second sets of ledger parameters;
determining, after recording the data item to the first and second distributed ledgers, that a set of archival parameters, associated with the first distributed ledger, have been met; and
removing the first distributed ledger from the group of distributed ledgers based on determining that the set of archival parameters, associated with the first distributed ledger, have been met, wherein the data item is retained in the second distributed ledger after the first distributed ledger is removed.

16. The method of claim 15, wherein the group of distributed ledgers is maintained by a plurality of nodes, wherein removing the first distributed ledger from the group of distributed ledgers includes notifying the plurality of nodes that the distributed ledger has been removed.

17. The method of claim 16, wherein the plurality of nodes maintain a set of ledger data associated with the group of distributed ledgers, wherein the plurality of nodes erase particular ledger data, associated with maintaining the first distributed ledger, based on receiving a notification that the first distributed ledger has been removed.

18. The method of claim 15,
wherein the set of ledger parameters associated with the first distributed ledger includes temporal parameters that include a first time window,
wherein the set of archival parameters associated with the first distributed ledger include one or more temporal conditions that include a second time window that is associated with data to be removed from the first distributed ledger,
wherein determining that the set of archival parameters, associated with the first distributed ledger have been met includes determining that the temporal parameters associated with the first distributed ledger meet the one or more temporal conditions, and wherein determining that the temporal parameters associated with the first distributed ledger meet the one or more temporal conditions includes determining that the first time window is within the second time window.

19. The method of claim 15,
wherein the set of archival parameters associated with the first distributed ledger include a first time indicating staleness of data, and
wherein determining that the set of archival parameters, associated with the first distributed ledger, have been met includes determining that ledger parameters associated with the first distributed ledger indicate that the first distributed ledger is associated with a second time that precedes the first time.

20. The method of claim 15, further comprising:
receiving a query;
determining that one or more attributes of the query match one or more ledger parameters associated with the first distributed ledger that has been removed; and
without performing a search on the other distributed ledgers of the group of distributed ledgers, providing a response to the query indicating that a result for the query was not found.

\* \* \* \* \*